United States Patent [19] [11] 4,145,448
Hayward et al. [45] * Mar. 20, 1979

[54] CEREAL PROTEIN FORTIFIED FOOD BAR

[75] Inventors: James R. Hayward, McHenry; William L. Keyser, East Dundee; Walter J. Zielinski, Ingleside, all of Ill.

[73] Assignee: The Quaker Oats Company, Chicago, Ill.

[*] Notice: The portion of the term of this patent subsequent to Apr. 19, 1994, has been disclaimed.

[21] Appl. No.: 868,902

[22] Filed: Jan. 12, 1978

Related U.S. Application Data

[63] Continuation of Ser. No. 710,480, Aug. 2, 1976, abandoned.

[51] Int. Cl.$^2$ ............................................. A23G 3/00
[52] U.S. Cl. ...................................... 426/72; 426/93; 426/99; 426/571

[58] Field of Search ............... 426/571, 532, 572, 541, 426/324, 321, 474, 89, 311, 310, 72, 73, 99, 96, 610, 601, 302, 648, 335, 289, 418, 309, 656, 618, 657, 808, 517, 93

[56] References Cited

U.S. PATENT DOCUMENTS

| | | | |
|---|---|---|---|
| 2,847,311 | 8/1958 | Dovmak et al. | 426/571 |
| 3,433,650 | 3/1969 | Block et al. | 426/99 |
| 4,018,901 | 4/1977 | Hayward et al. | 426/99 X |
| 4,038,423 | 7/1977 | Hayward et al. | 426/571 X |
| 4,049,832 | 9/1977 | Hayward et al. | 426/99 X |

*Primary Examiner*—Kenneth M. Schor
*Attorney, Agent, or Firm*—Charles J. Hunter

[57] ABSTRACT

A fortified product useful in the production of food bars is disclosed with the product comprising marshmallow having incorporated therein cereal material having a protein content of at least about 30 percent by weight and which has been heated to gelatinize the starch and denature the protein therein to the extent the ceral material will not substantially bind water but which does not have the nutritional content thereof substantially reduced through heating.

12 Claims, No Drawings

//CEREAL PROTEIN FORTIFIED FOOD BAR

CROSS REFERENCE TO RELATED APPLICATION

This application is a Continuation of Application Ser. No. 710,480, filed Aug. 2, 1976, now abandoned.

BACKGROUND OF THE INVENTION

1. Field of the Invention

This invention relates to a marshmallow based product which has been fortified by the addition thereto of protein and which is useful in production of food bars.

2. Description of the Prior Art

The basic process for the production of marshmallow as it is known today was first shown in U.S. Pat. No. 2,600,569 to E. T. Oakes in 1952. This invention was the first showing of the injection of gas into a marshmallow mix to cause it to puff upon release of the gas pressure. Since that time, many patents have issued showing different additions to marshmallows to provide different flavoring and other properties.

The inclusion of fats in marshmallows is not a new or novel idea. In U.S. Pat. No. 3,556,012 a thorough discussion of the inclusion of fats in marshmallow is presented with the fat in this case being cocoa butter fat.

In the present invention, however, it has been found that marshmallow can be fortified by inclusion therein of a protein material comprising cereal material having a protein content of at least 30 percent by weight which has been heat treated to significantly reduce its water absorption and which further does not present the problem associated with inclusion therein of significant amounts of fat. While it is possible that small amounts of cereal protein have been added to marshmallow prior to this invention, no one has shown the heat treatment of significant amounts of vegetable protein or animal protein or combinations thereof, to destroy the water binding properties thereof prior to its inclusion in the marshmallow. This is the first teaching of heat treated high protein material in marshmallows in the marshmallow industry.

SUMMARY OF THE INVENTION

It is an object of this invention to provide a marshmallow fortified with protein.

It is another object of this invention to provide a protein fortified marshmallow also including vitamin fortification.

It is an additional object of this invention to provide a marshmallow containing system which is stable against degradation of the fortification products.

It is a further object of this invention to provide a new and novel process for producing marshmallow based products.

The objects of this invention are accomplished by a marshmallow based product comprising: marshmallow having incorporated therein cereal material having a protein content of at least about 30 percent by weight and which has been heated to gelatinize the starch and denature the protein therein to the extent it will not substantially bind water, but which does not have the nutritional content thereof substantially reduced due to the heating said cereal material further being coated with fat to prevent substantial water absorption thereby.

In a preferred embodiment of this invention the prior discussed marshmallow based product has therein fat coated vitamins.

The objects of this invention are further accomplished by the combination comprising, a marshmallow based product comprising: marshmallow having incorporated herein cereal material having a protein content of at least about 30 percent by weight and which has been heated to gelatinize the starch and denature the protein therein to the extent it will not substantially bind water, but which does not have the nutritional content thereof substantially reduced due to the heating; a hermetically sealed container completely encircling the marshmallow; a water converting catalyst within the confines of the container; and an atmosphere surrounding the food product in the container, said atmosphere comprising no more than about 4 percent by weight oxygen and the remainder of the atmosphere comprising an inert gas and sufficient hydrogen to combine with all the oxygen and convert it to water.

Again, in the combination it may be desirable to include fat coated vitamins within the marshmallow product.

The objects of this invention are additionally accomplished by a process for producing a marshmallow based product, said process comprising:

a. preparing a cereal protein fortification ingredient of substantially reduced water binding capability by heating a cereal material having a protein content of at least about 30 percent by weight on a dry basis, said heating being sufficient to gelatinize the starch and denature the protein therein to the extent the cereal material will not substantially bind water, but said heating not substantially destroying the nutritional content thereof;

b. preparing a marshmallow mix;

c. mixing air with the marshmallow mixture until the atmospheric pressure density thereof is from about 30 to 74 ounces per gallon;

d. reducing any pressure on the air-marshmallow mix until the pressure is substantially atmospheric pressure;

e. mixing from 1 percent to 40 percent by weight of the non-water binding cereal protein fortification ingredient with from 60 percent to 99 percent by weight of the marshmallow mix; and f. allowing the mixture to set.

Again, it may be desirable to include with the marshmallow mix a fat coated vitamin. In addition, it may be desirable, following the process, to insert the set marshmallow in a container along with a water converting catalyst, then displace the atmosphere in the container with a hydrogen containing atmosphere containing not more than about 4 percent by weight oxygen, and thereafter seal the container to prevent further oxygen from reaching the material.

Marshmallow is an aerated food product usually composed of various saccharides, water, gelatin and flavoring agents. Although optional, marshmallow may also contain edible coloring and other minor edible ingredients such as edible humectants.

Marshmallow syrup is the mixture of ingredients that is aerated and whipped to form marshmallow. By use herein of the terms "marshmallow mix" and "marshmallow syrup", we intend to refer to a marshmallow syrup. Depending on the method for marshmallow production, marshmallow syrup usually has a moisture content of about 16–30 percent by weight, very little of which is lost in processing. A more detailed description of marshmallow syrup is found later on in this discussion.

Marshmallow syrup generally has a density of approximately 127 oz. per gallon. In the production of marshmallow, marshmallow syrup is whipped and intermixed with an inert, edible gas such as air or nitrogen until the density of the mixture is approximately 44 oz. per gallon. This volumetric expansion, i.e. volume increase of 2-3 times, gives marshmallow the characteristic spongy texture which consumers desire. In fact, these spongy and low-density texture characteristics are so common to marshmallow that consumers will not accept a product lacking in them.

Many different flavoring agents have been utilized to alter the taste of marshmallow. These flavoring agents have heretofore been required to have low fat contents and be used in such small quantities that the final marshmallow product has a very low fat content, i.e. usually below 1 percent by weight fat. This low fat content has been required in order to prevent excess fat from precluding expansion during whipping and aeration. Since the marshmallow whip is essentially a mixture of ingredients mixed with and whipped with water, very small quantities, i.e. above 1 percent by weight, of fats or oils have heretofore broken this whip preventing the required product expansion. This is obvious since oils or fats and water do not readily mix and thus would not be thought to be a combination which could be whipped. While some attempts have been made to increase the oil or fat level in marshmallow, these attempts have generally been through the addition of certain additives which prevent the oil from breaking the emulsion or whip. While these attempts have met minor success in providing incremental increases in fat content, the additional additives have created an off-taste or foreign taste which has made the marshmallow product unacceptable.

A marshmallow mix for use in production herein includes various ingredients which as described above include various non-reducing saccharides, water, gelatin and flavoring agents. By use of the term "gelatin" we intend to mean a gelatinous material obtained from animal tissues by prolonged boiling or any of the various substances resembling gelatin in physical properties. Gelatin is sold on the basis of bloom test or jelly test and gelatin having a bloom test or jelly test of from 150-300 grams is normally considered acceptable for marshmallow production. It is usually preferred, however, to use from 1.5 to 2.5 percent by weight of a gelatin having a bloom test of from 225-250 grams, with variations in bloom test values being compensated for by using less gelatin as the bloom test value increases.

By use herein of the term "marshmallow mix" it is intended to mean those mixed ingredients which are whipped and aerated to produce marshmallow. These include the marshmallow syrups known in the industry, and include by reference the description found in the Krohn and Polito patent, U.S. Pat. No. 3,556,812, modified to provide that the reducing sugars therein constitute no more than about 5 percent by weight reducing sugars, and preferably no more than 2 percent by weight reducing sugars.

The process of this invention, when the requirement is for the mixing of air with the marshmallow mix until the atmospheric pressure density thereof is from about 30-74 oz. per gallon, it is intended to mean those processes in which air can be injected or whipped into the marshmallow mix to give it the requisite density. For instance, the Oakes type gas injection system, as previously referred to, is perfectly acceptable. Additionally, the whipping of air by a simple wire mixer can be sufficient so long as sufficient air is included in the product to insure the requisite density. Additionally other new types of marshmallow equipment well known in the industry are now capable of inserting or injecting sufficient amounts of air into the marshmallow while mixing it to provide at atmospheric pressure the requisite density. If the mixing is not at atmospheric pressure, then prior to the casting or setting thereof the pressure must be reduced until it is approximately atmospheric.

Marshmallow mixes that may be used in this invention are well known in the industry. Ingredients used in marshmallow production as well as amounts thereof are well known in the marshmallow industry. Among the many formulas that are acceptable for marshmallow production are those found in the following: *Candy Making As a Science and Art,* by Claude D. Barnette, Don Guessel Publications, Inc., N.Y., 1960, pp. 99-103; *Encyclopedia of Candy And IceCream Making,* by Simon I. Leon, Chemical Publishing Co., N.Y., 1959, pp. 294-304; and *A Textbook On Candy Making,* by Alfred E. Leighton, Manufacturing Confectioners Publishing Co., Oak Park, Illinois, 1952, pp. 55-68. A typical formula for use herein would include about 60-85 percent by weight sucrose, about 15-25 percent by weight water and about 1-4 percent by weight gelatin. The typical formula may also include some alterations of the formula such as replacing part or all of the reducing sugars and syrups with non-reducing sugars and syrups. It is preferable to minimize the amount of reducing sugars used in this invention. Various flavoring agents and humectants may also be added in minor amounts. Preferably in this invention the marshmallow mix has about 80.1 percent by weight sucrose, about 18.3 percent by weight water, about 1.2 percent by weight gelatin, and about 0.4 percent other ingredients such as flavoring, color and preservatives.

It must be emphasized that the reducing sugars must be kept to a minimum, i.e. below about 5 percent by weight, or the adverse effect on the protein will make the product unacceptable.

The density of the marshmallow produced by this invention must be from 30-74 oz. per gallon at atmospheric pressure, and sufficient air must be inserted therein to produce this requisite density effect. When referring to density of the product it is intended to refer to the density at atmospheric pressure, i.e., gas pressure removed, unless it is otherwise stated.

It is preferred to maintain the aerated marshmallow mixture at a temperature of from about 80° F. to about 90° F. during the processing. However, such other temperatures as may be commonly used in the marshmallow industry are acceptable outside the preferred range.

The marshmallow product of this invention has incorporated therein cereal material having a protein content of at least about 30 percent by weight. The cereal material for use in this invention is the type of cereal material which has been concentrated with respect to the protein to provide a protein content greater than 30 percent by weight. Soy protein concentrate and soy protein isolate are good examples of such a product. Other vegetable proteins or animal proteins or combinations thereof are also useful in fortification for protein purposes. When the cereal material has been concentrated to a high protein content, it nevertheless has some remaining starch therein as well as having a high protein content. The product then must be heated to gelatinize the starch and denature the protein therein to the extent that it will not substantially bind water. It has been found for instance that a time of heating of ½ to 1½ minutes for a temperature of 350° F. is sufficient to provide this effect, however, other such times and temperatures as will substantially gelatinize the starch and denature the protein therein are acceptable so long as they provide the requisite effect on reducing substantially the water binding capability and it is within the skill of one experienced in the industry to provide an equivalent heat treatment. The heating of the product to gelatinize the starch must not be so great, however, that it destroys the nutritional content of the protein. That is, the product must not substantially reduce the protein efficiency ratio of the protein material. After the cereal material has been heated to the point that the starch is gelatinized and the protein denatured so that the material will not bind water, it can then be included in the product. In inserting the heat treated cereal material into the marshmallow, it is preferable to first prepare the marshmallow mix and then inject air therein, followed by reduction of the pressure down to atmospheric pressure. After the product has been expanded at atmospheric pressure, it is preferred to fold the heat treated cereal material into the expanded marshmallow to produce a product which is then set. While it is highly preferable to fold the cereal material into the marshmallow mix after the expansion of the mix, nevertheless there are some situations where one may simply want to include it in the mix at the start, however, this is not desirable since it tends to destroy the aeration properties of the mix.

It is desirable within the scope of this invention to coat the cereal material with fat after the cereal material has been heated to the point that the starch is gelatinized and the protein denatured. This fat coating step helps to prevent substantial water absorption by the cereal material.

It is also desirable within the scope of this invention to include fat coated vitamins within the marshmallow mix. In such a case, the fat coated vitamins are coated with a fatty material comprising a saturated aliphatic acid having between 12 and 20 carbon atoms inclusive or a glyceride having the formula:

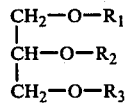

wherein $R_1$ is an acyl radical derived from a saturated aliphatic acid having between 12 and 20 carbon atoms per molecule and $R_2$ and $R_3$ are hydrogen or the same as $R_1$, and said fatty material has a melting point of from 100° F. to 200° F.

Preferably, vitamins, such as vitamin C, are coated in the above process by mixing them with a fatty material and then admixing this mixture of vitamins and fatty material with a liquid or solid cooling agent, with the cooling agent being admixed in an amount sufficient to solidfy the mixture and maintain the mixture solidifed throughout the coating process. The cooling agent is non-toxic and chemically inert with respect to the vitamins and fatty material. After the mixture has been mixed in the solid state and solidifed, the mixture is subdivided until a major portion thereof passes through a No. 20 U.S. Sieve but has a particle size above about 75 microns in diameter. After subdivision, the cooling material is removed by sublimation or evaporation. Liquid nitrogen and dry ice are very good for use as cooling agents herein.

In preparing the marshmallow mix of this invention the mix is first prepared, and any fat coated vitamins that are to be used are included in the mix. The marshmallow mix is then mixed with air until the atmospheric pressure density thereof is from 30-74 oz. per gallon. That is, when the pressure, if such exists on the marshmallow is reduced, the marshmallow will expand until it has a requisite density. Likewise, if wire beaters or other marshmallow machines are used, the air must be mixed therein until a product has the requisite density. If any pressure is on the product, then it must be reduced until it is at atmospheric pressure at which time, after inclusion of the folding in of the cereal protein material, the mixture is allowed to set.

In the process of this invention, it is preferable, for purposes of stability and prolonging of the nutritional characteristics, to insert the marshmallow into a container along with a water converting catalyst. The water converting catalyst can be any of the known catalysts that are inert with respect to the product and which are also non-toxic when included into a food package. It has been found, for instance, that it is highly desirable to use a noble metal catalyst including such things as palladium and platinum catalysts which are well known to convert a mixture of oxygen and hydrogen to water. It must be understood then that by use herein of the term "water converting catalyst" it is intended to mean any catalyst which is inert with respect to the food product and which will convert a mixture of hydrogen and oxygen to water. The catalyst can be sandwiches between layers of air permeable material or can be attached to the container wall or to an insert placed in the container or any other such method which will provide contact with the atmosphere without contaminating the product.

After the product is inserted into the container, with the water converting catalyst, the atmosphere thereon must be displaced with a hydrogen containing atmosphere containing not more than about 4 percent by weight oxygen. In this case, the hydrogen containing atmosphere must be an inert gas, inert with respect to the product, non-toxic, and having sufficient hydrogen to combine with the oxygen, and preferably with an excess of hydrogen so that there is insurance that all the oxygen is converted to water. Nitrogen has been found to be a highly acceptable inert atmosphere for inclusion with the hydrogen. The displacement of the atmosphere with the inert gas and hydrogen can be a displacement using a flushing system, which flushes completely the surrounding atmosphere in the container, or may be a double flushing system or a combination of flushing and vacuum relief or any such combination as long as the end goal of removal of all or substantially all of the oxygen, or at least until about 4 percent by weight maximum oxygen, is achieved. Thereafter, the container is sealed to prevent further oxygen from reaching the product. At such time, gradually over the containing of the product, the catalyst converts the oxygen and hydrogen to water and the water produced is absorbed by the product. The amount of produced water is so small that it doesn't have a harmful effect on the product and is either retained in the container or absorbed and stabilized by the product. In such a case, no oxygen remains in the free state to combine with the proteinaceous material or the vitamins, and, as such, the oxygen is incapable of rendering these products ineffective or degrading them. Additionally, the benefits of the product are such that it does not degrade due to oxygenation of any of the materials or ingredients within the marshmallow, and additionally, the sealing of the container prevents marshmallow product from losing its moisture and becoming hard.

DESCRIPTION OF THE PREFERRED EMBODIMENTS

This invention may be more fully described but is not limited by the following examples.

EXAMPLE 1

A marshmallow mix is prepared. For the mixture 0.927 parts by weight gelatin (bloom test strength 250 grams) is added to a first jacketed kettle containing 8.2 parts by weight water. The gelatin is allowed to soak in the water for 5 minutes and then steam is introduced into the jacketed kettle until the temperature of the mixture is 145° F. While maintaining the mixture at 145° F. the mixture is stirred until all the gelatin is dissolved in the water. The mixture is then set aside for inclusion in the process. This mixture is referred to as the gelatin mix. The marshmallow premix is prepared in a second jacketed kettle. For the marshmallow premix, 8.3 parts by weight water, 0.067 parts by weight preservative, 77.2 parts by weight sucrose, 0.046 parts by weight flavoring (vanilla), and 0.21 parts by weight color are added to the jacketed kettle. These ingredients are then stirred until completely mixed. The marshmallow mixture or marshmallow syrup is then prepared by adding the gelatin mix prepared in the first jacketed kettle to the marshmallow premix in the second jacketed kettle. These ingredients are then thoroughly mixed until the mixture is uniform throughout with regard to each of the ingredients. The ingredients are circulated through a heat exchanger and the temperature is reduced to about 75° F. and maintained constant at that temperature. The mixture is then introduced as a continuous stream into an Oakes continuous marshmallow mixer and beater (The E. T. Oakes Corporation, Islip, N.Y.). The mixer is adjusted so that the aerated marshmallow mixture leaving the mixer is at a temperature of 85° F. plus or minus 3° F. Air is injected into the mixture and the flow rate and pressure of the air are adjusted until samples of the product exposed to atmospheric pressure have a density of about 45–55 oz. per gallon. Pressure of the aerated mixture leaving the mixer is found to fluctuate within the range of about 40–60 psig. The cereal material, comprising soy protein concentrate having a protein content of about 50 percent is heated for one minute at 350° F. to gelatinize the remaining starch therein. After cooling. 10 parts by weight of this mixture are folded into the marshmallow mixture described above. The mixture, after complete blending is then allowed to set. This uniformly blended mixture has a moisture content of about 28 percent by weight, a density in the range of about 111–119 ounces per gallon, a sweet flavor, a firm moist spongy characteristic marshmallow texture and quality color. Additionally, the product has suitable nutritional characteristics characterized by high percentage of protein therein.

EXAMPLE 2

Example 2 is repeated with the exception that 0.01 parts by weight of vitamin mix is included in the marshmallow. The vitamin mix is prepared by adding vitamin C to a vegetable shortening having a melting point of about 145° F. and then mixing this with carbon dioxide in the solid state in an amount of about 4 times by weight of the vitamin C and vegetable fat. The mixture is then thoroughly mixed, subdivided and placed through a screen to give it a particle size distribution such that it will pass through a No. 20 U.S. Sieve but has a particle size above about 75 microns. The dry ice is then allowed to sublime off of the mixture giving a fat coated vitamin C. The vitamin mixture is then mixed into the marshmallow mix and the marshmallow process of Example 1 is continued to give a quality product of good taste, fortified both in protein and vitamin content.

EXAMPLE 3

Example 1 is repeated with the exception that after the product is produced it is then placed in a bag along with the palladium catalyst. The palladium catalyst is sandwiched between layers of polyethylene which are permeable to the atmosphere sufficient to allow the atmosphere to pass therethrough. The bag is then flushed with a mixture containing 8 parts by weight hydrogen and 92 parts by weight nitrogen. After double flushing with this gas, the product is then sealed in the container to prevent further oxygen from entering the bag. After a period of time, the product is found to have high quality and good taste, and the product added thereto is found to be very stable.

It may thus be seen that this invention provides a new and novel marshmallow product which is highly desirable with respect to its fortification features of fortified protein as well as fortified vitamins. The fortification features are stable against deterioration of the fortified ingredients. The coating of the fat onto the vitamin fortification materials prevents degradation due to moisture and oxygen in the product. The fortified ingredients, therefore, are allowed to fortify the product throughout the entire process and provide a constantly high quality product. Heretofore, there has been a need for the production of marshmallows being able to incorporate therein large quantities of cereal protein material. In addition, there has never been a combination of utilization of large amounts of cereal protein along with fat coated vitamins in a marshmallow product. The process and product of this invention, therefore, are new and unique and provide a product long needed in the marshmallow industry.

Having fully described this new and unique invention, the following is claimed:

1. A marshmallow based product consisting essentially of: marshmallow, low in reducing sugars and having incorporated therein, before the marshmallow is allowed to set to any degree, starch containing cereal material, said cereal material having a protein content of at least about 30 percent by weight, wherein said cereal material has been heated prior to its incorporation into the marshmallow to gelatinize the starch and denature the protein therein, but which does not have the nutritional content thereof substantially reduced due to the heating, and said cereal material further being coated with fat to prevent substantial water absorption thereby.

2. A marshmallow based product as in claim 1 further including therein fat coated vitamins.

3. A marshmallow based product as in claim 1 wherein the cereal material is present in an amount of from 10–40 percent by weight.

4. In combination a marshmallow based product consisting essentially of: marshmallow low in reducing sugars and having incorporated therein, before the marshmallow is allowed to set to any degree, starch containing cereal material, said cereal material having a protein content of at least about 30 percent by weight, wherein said cereal material has been heated prior to its incorporation into the marshmallow to gelatinize the starch and denature the protein therein, but which does not have the nutritional content thereof substantially reduced due to the heating, said cereal material further being coated with fat to prevent substantial water absorption thereby; a hermetically sealed container completely encircling the marshmallow; a water converting catalyst within the confines of the container; and an atmosphere surrounding the food product in the container, said atmosphere comprising no more than about 4 percent by weight oxygen and the remainder of the atmosphere comprising an inert gas and sufficient hydrogen to combine with all the oxygen and convert it to water.

5. The combination as in claim 4 wherein the cereal material is present in an amount of from 10–40 percent by weight.

6. The combination as in claim 4 further including fat coated vitamins in the marshmallow based product.

7. A marshmallow based product consisting essentially of: marshmallow, low in reducing sugars and having incorporated therein, before the marshmallow is allowed to set to any degree, animal and/or plant protein material containing starch, said animal and/or plant protein material having a protein content of at least about 30 percent by weight, wherein said animal and/or plant protein material has been heated prior to its incorporation into the marshmallow to gelatinize the starch and denature the protein therein, but which does not have the nutritional content thereof substantially reduced due to the heating, and said animal and/or plant protein material further being coated with fat to prevent substantial water absorption thereby.

8. A marshmallow based product as in claim 7 further including therein fat coated vitamins.

9. A marshmallow based product as in claim 7 wherein the animal and/or plant protein material is present in an amount of from 10–40 percent by weight.

10. In combination, a marshmallow based product consisting essentially of: marshmallow low in reducing sugars and having incorporated therein before the marshmallow is allowed to set to any degree, a starch containing protein material having a protein content of at least about 30 percent by weight, wherein said protein material has been heated prior to its incorporation into the marshmallow to gelatinize the starch and denature the protein therein, but which does not have the nutritional content thereof substantially reduced due to the heating, said protein material further being coated with fat to prevent substantial water absorption thereby; a hermetically sealed container completely encircling the marshmallow; a water converting catalyst within the confines of the container; and an atmosphere surrounding the food product in the container, said atmosphere comprising no more than about 4 percent by weight oxygen and the remainder of the atmosphere comprising an inert gas and sufficient hydrogen to combine with all the oxygen and convert it to water.

11. The combination as in claim 10 wherein the protein containing material is present in an amount of from 10–40 percent by weight.

12. The combination as in claim 10 further including fat coated vitamins in the marshmallow based product.

* * * * *